UNITED STATES PATENT OFFICE 2,013,790

BROMINATION OF PYRANTHRONE

John H. Sachs, Wilmington, Del., and Ferdinand W. Peck, Pennsgrove, N. J., assignors to E. I. du Pont de Nemours & Company, Wilmington, Del., a corporation of Delaware No Drawing. Application October 3, 1931, Serial No. 566,792. Renewed October 12, 1934

10 Claims. (Cl. 260—61)

This invention relates to the bromination of pyranthrone.

It has been proposed to halogenate pyranthrone to form derivatives containing one or more and up to five halogen atoms. The halogenation in such proposed processes is carried out in sulfuric acid or chlorosulfonic acid solutions. Such proposed halogenations are subject to the disadvantage caused by the fact that for every atom of halogen introduced into the molecule it is necessary to employ two halogen atoms. Thus, in the halogenation of a saturated aryl compound represented by RH, the reaction takes place according to the following formula:

$$RH + 2Cl \rightarrow RCl + HCl$$

or $$RH + 2Br \rightarrow RBr + HBr$$

It will be seen for every atom of halogen introduced into the molecule a molecule of the corresponding halogen acid is formed as a by-product. In the case of a bromination, the relatively unstable hydrobromic acid which is formed must be recovered as a bromide and the bromide subsequently oxidized in order to regenerate the bromine.

Our invention has for an object a method of brominating pyranthrone, which can be carried out without the uneconomical formation of hydrobromic acid as a by-product and the necessity of subsequent oxidation to regenerate the bromine otherwise formed.

A further object is the bromination of pyranthrone by a series of simple, easily controlled and economical steps which result in the production of brominated products of high purity and usefulness. Other objects will appear as our description proceeds.

We have found that it is possible to dissolve or suspend pyranthrone in a solvent which is substantially non-reactive thereto, and after mixing the same with a substantially equivalent amount of bromine conduct the bromination under an elevated pressure in the presence of an atmosphere containing chlorine gas. In general, our improved method takes advantage of two facts, first, that hydrobromic acid can be oxidized to bromine by means of chlorine because of the relatively greater general activity of chlorine. In the second place, we take advantage of the fact that under the conditions of the reaction the bromination of pyranthrone proceeds more readily than does the chlorination.

The following examples are illustrative of our process:

*Example 1*

300 parts of pyranthrone are dissolved in 3000 parts of sulfuric acid of 96–99.5% strength, contained in a cast iron vessel which can be closed and subjected to pressures up to 150 pounds per square inch. Three parts of iodine and 136 parts of bromine are then added, which quantity corresponds to an 18% excess of that required by the following formula where $RH_2$ represents the pyranthrone.

$$RH_2 + Br_2 + Cl \rightarrow RBr_2 + 2HCl$$

The vessel is closed and through a valve there is added 60 parts of chlorine whereby a pressure of 80–85 pounds develops when the temperature is raised to 50–55° C. The mixture is held at this temperature under agitation for twenty-four hours and then blown into water. The product, which is substantially a dibrompyranthrone, separates in bright reddish orange microscopic crystals which are filtered off, washed with water, and dried, or converted into a paste by well known means. When dry, the product is a bright reddish orange powder which dyes cotton from a hydrosulfite vat in reddish violet shades. On oxidation by means of air, the shade changes to a bright reddish orange. The product contains 26–27% of bromine and 1–2% of chlorine.

We have also found that the halogenation can be effected in an indifferent solvent such as dichlorobenzene or nitrobenzene, if the reaction is carried out in an enamel-lined or nickel vessel.

*Example 2*

300 parts of pyranthrone are suspended in 3000 parts of nitrobenzene contained in a nickel vessel which can be tightly closed and which will stand a working pressure of 150 pounds per square inch. 135 parts of bromine are added, the vessel is closed and through a valve 60 parts of chlorine are added, whereby a pressure of 50–60 pounds develops when the temperature is raised to 50–55° C. The mass is allowed to agitate at this temperature until a test portion shows that the bromine content is between 25 and 27.5%. The pressure is released, the nitrobenzene is distilled with steam, and the product filtered off, washed with water and dried. It is identical with that obtained according to Example 1.

It is to be understood that the above examples are given merely by way of illustration and that numerous modifications may be made in respect to time, amount of reagents, and conditions of temperature and pressure without departing from the spirit of our invention.

Our invention possesses marked advantages. The economy resulting from the elimination of the formation of a mol. of hydrobromic acid and the subsequent treatment thereof to regenerate the bromine is obvious. A further advantage is that the process is conducted in a closed vessel, thereby eliminating the danger and annoyance resulting from the escape of chlorine and bromine fumes, the toxicity of which is well known. In general, our process results in the formation of products of remarkable purity. This purity may be enhanced if, after the halogenation, the sulfuric acid solution of the halogenated derivative is diluted to a sulfuric acid solution of about 80–85% strength, whereupon the brom derivative crystallizes and is filtered off. It is subsequently hydrolyzed and converted into a paste or powder by well known methods.

Since many embodiments of this invention, differing widely in one or more respects, may be made without departing from the spirit of our invention, it is to be understood that we do not limit ourselves to the foregoing examples or description except as indicated in the following claims.

We claim:

1. A process of brominating pyranthrone which comprises subjecting pyranthrone and bromine to an elevated pressure in the presence of chlorine.

2. A process of brominating pyranthrone which comprises mixing a solution of pyranthrone together with bromine in a closed vessel and subjecting said mixture to an elevated pressure in an atmosphere of chlorine.

3. A process of brominating pyranthrone which comprises mixing a solution of pyranthrone in a solvent non-reactive thereto together with bromine in a closed vessel, and subjecting said mixture to an elevated pressure in an atmosphere of chlorine.

4. A process of brominating pyranthrone which comprises mixing a solution of pyranthrone in concentrated sulfuric acid together with bromine in a closed vessel, and subjecting said mixture to an elevated pressure in an atmosphere of chlorine.

5. A process of brominating pyranthrone which comprises mixing a solution of pyranthrone in nitrobenzene together with bromine in a closed vessel, and subjecting said mixture to an elevated pressure in an atmosphere of chlorine.

6. A process of brominating pyranthrone which comprises mixing a solution of pyranthrone in dichlorobenzene together with bromine in a closed vessel, and subjecting said mixture to an elevated pressure in an atmosphere of chlorine.

7. A process of brominating pyranthrone which comprises mixing a solution of pyranthrone in concentrated sulfuric acid together with bromine in a closed vessel, and agitating said mixture under a pressure of about 80–85 pounds per square inch and in the presence of chlorine gas.

8. The product produced by the process of claim 7.

9. The process of producing dibromo-pyranthrone, which comprises reacting upon substantially 1 mol. of pyranthrone with slightly over 1 mol. of bromine, at elevated temperature and pressure, and in the presence of not less than 1 mol. of chlorine.

10. The product produced by the process of claim 9.

JOHN H. SACHS.
FERDINAND W. PECK.